United States Patent [19]

White

[11] Patent Number: 4,907,844
[45] Date of Patent: Mar. 13, 1990

[54] UNCANCELLED TURN SIGNAL INDICATOR

[76] Inventor: Ralph C. White, 8560 Park La., #34, Dallas, Tex. 75231

[21] Appl. No.: 328,665

[22] Filed: Mar. 27, 1989

[51] Int. Cl.⁴ .............................. B60Q 1/00; B60Q 1/40
[52] U.S. Cl. .................................... 340/457; 340/476; 340/477; 340/815.3
[58] Field of Search ............... 340/457, 476, 477, 465, 340/522, 815.3

[56] References Cited

U.S. PATENT DOCUMENTS

| | | | |
|---|---|---|---|
| 3,806,868 | 4/1974 | Portman | 340/457 |
| 3,964,019 | 6/1976 | Wethe et al. | 340/457 |
| 4,254,397 | 3/1981 | Shannon | 340/56 |
| 4,333,071 | 6/1982 | Kira et al. | 340/56 |
| 4,358,751 | 11/1982 | Roudebush, Jr. | 340/73 |
| 4,731,546 | 3/1988 | Hau | 307/10 LS |
| 4,792,785 | 12/1988 | Yukio et al. | 340/477 |

Primary Examiner—Donnie L. Crosland
Attorney, Agent, or Firm—Henderson & Sturm

[57] ABSTRACT

An uncancelled turn signal indicator senses both that the monitored vehicle has a speed in excess of a predetermined threshold, and that a turn signal indicator for the vehicle has been selected for more than a predetermined period of activation. Upon sensing coincidence of both conditions, audible and visual indicators are provided to the driver of the vehicle to alert the driver of this condition.

6 Claims, 1 Drawing Sheet

UNCANCELLED TURN SIGNAL INDICATOR

TECHNICAL FIELD

This invention relates generally to turn signal indicators in vehicles.

BACKGROUND ART

Many vehicles are equipped with turn signal indicators to provide a visual indication to other persons in the vicinity of the vehicle that the driver of the vehicle intends to make a turn imminently. In general, such turn signal indicators are comprised of signal lights mounted on either side of the vehicle. Upon selecting a particular turn indicator (such as left or right), a series of electric pulses are provided to the corresponding turn signal indicator light to cause the light to flash on and off. It is this flashing that comprises the indication that a turn is about to be made.

In general, such turn signal indicators are actuated through an intentional act on the part of the driver. Following activation, however, deactivation of the turn signal is generally accomplished in an automatic manner. For example, a simple mechanical coupling may be used to cause the turn signal actuation mechanism to return to a non-activated state following conclusion of the turn. For one reason or another, however, the turn or other vehicle activity (such as a lane change) may be accomplished in such a way as to fail to trigger the deactivation mechanism. When this occurs, the turn signal indicator will continue to flash and therefore continue to suggest to those in the vicinity of the vehicle that an action commensurate with the indication may imminently occur. Depending upon other factors, such as alertness and/or driving conditions, the driver may fail to notice this condition, and hence the turn signal indicator will continue to flash for a significant period of time.

This mis-instruction to those in the vicinity of the vehicle constitutes at minimum a nuisance and often can give rise to a more dangerous situation, since persons in the area of the vehicle are mis-informed regarding the true intentions of the driver of the vehicle.

A need exists for an uncancelled turn signal indicator to alert a driver that a turn signal has not yet been cancelled when general factors surrounding the activation of the turn signal would otherwise suggest that the turn signal should in all likelihood be terminated.

DISCLOSURE OF THE INVENTION

This need and others are substantially met through provision of the uncancelled turn signal indicator disclosed herein. This indicator functions in conjunction with a vehicle having at least one turn signal indicator. The uncancelled turn signal indicator itself includes generally a speed sensor for detecting when the vehicle exceeds at least a predetermined threshold speed, and a turn signal indicator sensor for sensing activation and deactivation of the vehicle's turn signal indicator. A duration sensor monitors the turn signal indicator sensor and determines when the turn signal indicator has been active for more than a predetermined period of activation. A logic unit responds to both the speed sensor and the duration sensor and provides a trigger signal when it would appear that the vehicle has reached at least a predetermined speed and the turn signal indicator has been activated for at least a predetermined period of activation. The logic unit, upon sensing this condition, activates an indicator, such as an audible alarm and/or a light, to provide an indication to the vehicle driver that the turn signal indicator has not yet been cancelled.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
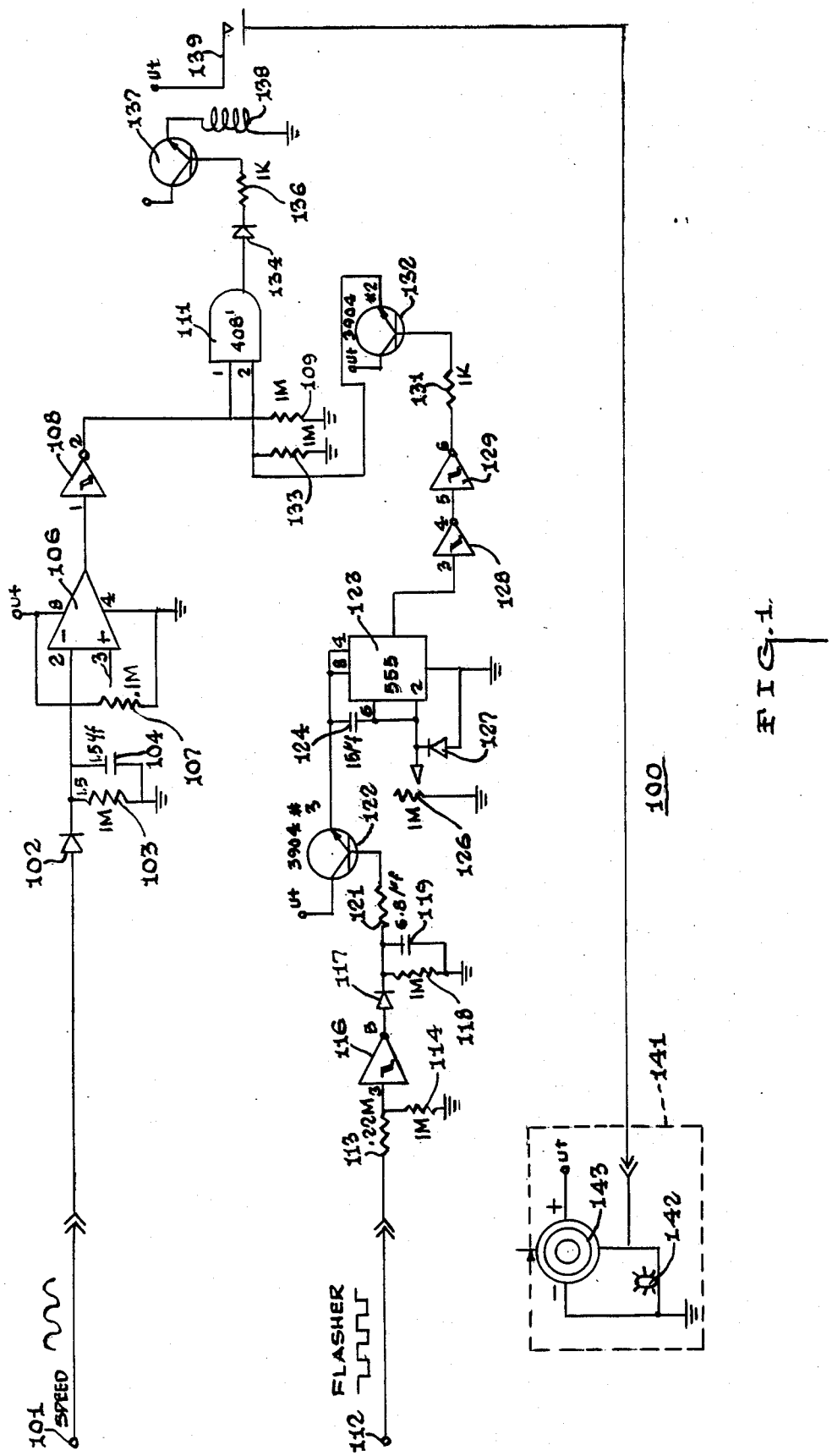
FIG. 1 comprises a schematic diagram of the invention.

Referring now to the drawings, the invention can been seen as depicted generally by the numeral 100. The uncancelled turn signal indicator (100) includes a first input (101) for receiving information from the vehicle's own speed sensors. This input couples through a forward biased diode (102) to an integrating unit comprised of a parallel configured grounded 1 mega ohm resistor (103) and a 1.5 microfarad capacitor (104) to the inverting input of a comparator (106) (such as an LM 1458). The non-inverting input of this comparator (106) connects to a 100K ohm variable resistor (107) that couples between a power source and ground and provides an appropriate threshold reference for the comparator (106). The output of this comparator (106) couples through an inverter (108) to a grounded 1 mega ohm resistor (109) and to one input of a two input AND gate (111). So configured, this speed sensor circuit will provide an enabling signal to the AND gate (111) input whenever the speed of the monitored vehicle exceeds a predetermined threshold (in this embodiment, approximately 30 miles per hour).

The uncancelled turn indicator (100) also includes an input (112) for receiving the pulses that are also provided to the vehicle's turn signal indicator for causing it to flash. These signals pass through an appropriate voltage divider comprised of a 220 K ohm resistor (113) and a grounded 1 mega ohm resistor (114) to an inverter (116). The output of the inverter (116) couples through a forward biased diode (117) and an integrating network comprised of a parallel coupled and grounded 1 mega ohm resistor (118) and a 6.8 microfarad capacitor (119) to a 1 K ohm resistor (121) to provide a drive signal to the base of an NPN switching transistor (122). The collector of this transistor (122) connects to the system voltage source and the emitter couples to a 555 timer (123) as described below in more detail.

The reset (pin 4) and $V_{cc}$ (pin 8) ports of the timer (123) couple to the emitter of the switching transistor (122). The threshold port (pin 6) couples through a 15 microfarad capacitor (124) to the transistor's emitter and to the discharge port (pin 2). The discharge port (pin 2) also couples to a grounded 1 mega ohm variable resistor (126) and through a back-biased diode (127) to ground. The ground port (pin 1) of the timer (123) couples to ground, and the output port (pin 3) couples through two series connected inverters (128, 129) and through a 1 K ohm biasing resistor (131) to the base of a second switching transistor (132).

The collector of the second switching transistor (132) couples to the system voltage source, and the emitter couples to both a grounded 1 mega ohm resistor 9133)

and to the remaining input of the two input AND gate (111).

So configured, this circuit comprises a turn signal indicator sensor and a duration sensor that acts in concert to sense both activation and deactivation of the vehicle's turn signal indicator, and to also determine when the turn signal indicator has been continuously activated for more than at least a predetermined period of activation. In this particular embodiment, the predetermined period of activation is determined as a function of the number of flasher pulses that are provided in ordinary course to the turn signal indicators.

The output of the AND gate (111) couples through a series connected diode (134) and 1 K ohm resistor (136) to the base of a third switching transistor (137). The collector of the latter couples to a reference voltage and the emitter couples to the solenoid (138) of a relay. The switch (139) associated with the relay couples in turn to an indicator unit (141). The indicator unit (141) in this embodiment includes a display unit comprised of a light bulb (142) to provide a visual indication to the driver, and an audible alarm unit (143) that provides an audible indication to the driver.

So configured, the AND gate (111) provides a logic function. In particular, the AND gate (111) provides an output signal whenever the vehicle being monitored has a speed that exceeds the predetermined threshold (in this case 30 miles per hour) and the turn signal indicators for the vehicle have been continuously activated for more than a predetermined period of activation. This signal from the AND gate (111) caused the relay switch 9139) to close and this in turn activates the visual and audible alarm devices of the indicator unit (141). So alerted, the driver will manually cancel the turn signal indicator, and this will terminate the flow of turn signal flasher pulses. This in turn will cause the turn signal indicator sensor circuit to remove an enabling signal from the AND gate (111) and this will open the relay switch 9139) and cancel the audible and visual indicators.

I claim:

1. An uncancelled turn signal indicator for use with a vehicle having at least one turn signal indicator, the uncancelled turn signal indicator comprising:
   speed sense means for providing a speed sense signal when said vehicle's speed at least equals a predetermined speed;
   turn signal indicator sense means for sensing activation and deactivation of said turn signal indicator;
   duration sense means responsive to said turn signal indicator sense means for providing an output signal when said turn signal indicator has been continuously activated for more than at least a predetermined period of activation;
   logic means responsive to said speed sense signal and said output signal for providing a trigger signal when both said speed sense signal and said output signal are present; and
   indicator means responsive to said trigger signal for providing an indication to a driver of said vehicle that said turn signal indicator has not been cancelled.

2. The uncancelled turn signal indicator of claim 1 wherein said turn signal indicator is activated by a series of pulses, and said predetermined period of activation comprises a predetermined number of said pulses.

3. The uncancelled turn signal indicator of claim 1 wherein said indicator means includes display means for providing a visual indication to said driver.

4. The uncancelled turn signal indicator of claim 1 wherein said indicator means includes audible alarm means for providing an audible indication to said driver.

5. The uncancelled turn signal indicator of claim 1 wherein said indicator means includes:
   display means for providing a visual indication to said driver; and
   audible alarm means for providing an audible indication to said driver.

6. The uncanceled turn signal indicator of claim 1 wherein said predetermined speed equals 30 miles per hour.

* * * * *